May 23, 1933. P. L. ROBERTSON 1,910,182
SLOTTED SOCKET SCREW
Filed Oct. 18, 1930

Inventor.
Peter L. Robertson.

by AJSDennison
atty.

Patented May 23, 1933

1,910,182

UNITED STATES PATENT OFFICE

PETER L. ROBERTSON, OF MILTON, ONTARIO, CANADA

SLOTTED SOCKET SCREW

Application filed October 18, 1930. Serial No. 489,607.

The principal objects of this invention are to provide a screw which will be readily driven either by the ordinary flat blade screw driver or by the tapered squared end screw driver used for socket screws.

A still further object is to provide a screw which may be readily adjusted by either type of screw driver, thus obviating the inconvenience and annoyance due to either form of screw driver being not available.

A still further object is to provide a screw, the head of which will very securely grip the end of the socket screw driver and which will also facilitate the entrance of the screw driver into operating engagement.

A further and important object is to enable the production of a combined slot and socket screw with the minimum displacement or removal of material, effecting a reduction of wear and strain on the forming tools and a resultant reduction in cost of the finished article.

The principal feature of the invention consists in the novel construction of a screw head with a rectangular socket having slightly tapering sides and chamfered edges leading thereto, together with a tapered end to receive the pyramidal end of the screw driver and which is diagonally intersected by a deep slot cut across the recess.

In the accompanying drawing, Figure 1 is a plan view of my improved form of screw head as applied to a countersunk head screw.

Figure 1:
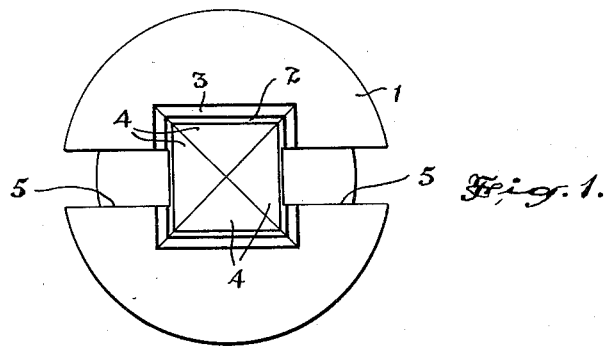
Figure 2:
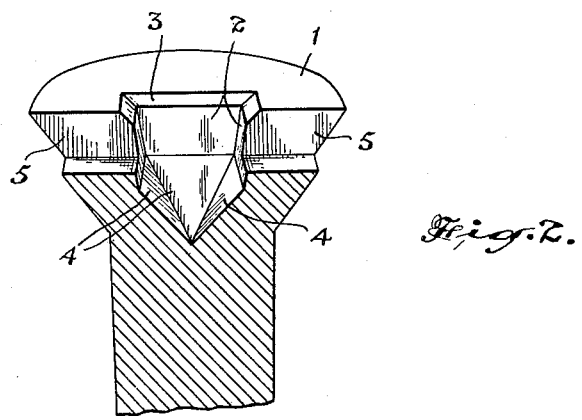
Figure 2 is a vertical mid-sectional view of the screw shown in Figure 1.

In the invention herein shown, the screw head 1 is formed with a central squared socket which is punched into the material of the screw and has the very slightly tapering side walls 2 which are formed with the chamfered edge 3 at the outer side and lead to the pyramidal converging surfaces 4.

A slot 5 is cut transversely of the head 1, preferably across the diameter of the squared socket.

The provision of this slot does not in any manner interfere with the action of the tapered end and pyramidal pointed screw driver which is directed into the recess by the chamfered edges 3 and securely grips the tapered surfaces 4, the pyramidal point guiding it into place.

Figure 3:
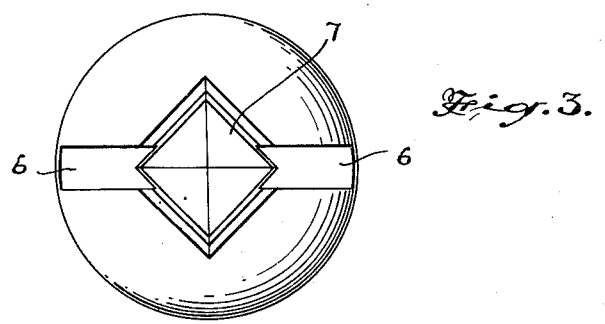
Figure 3 is a plan view of a modified form in the form of a round head screw.

In the form of the invention shown in Figure 3 a round-headed screw is shown with the transverse slot 6 extending across the diagonals of the tapered rectangular orifice 7, into which the pyramidal-shaped end of the socket screw driver is inserted.

The transverse slot does not in any manner detract from the use of the rectangular socket but it does enable the use of the screw or the adjustment thereof where a socket screw driver is not available and a flat bladed screw driver may be used.

Referring particularly to the form of the invention shown in Figure 3 of the drawing, the formation of the slot 6 in diagonal relation to the central rectangular socket produces a particularly valuable combination since it will be observed that in so relating the respective screw driver receiving recesses the combination is produced by the very minimum displacement or removal of metal from the head with a consequent reduction in wear and strain on the forming dies or tools, consuming less energy in production and reducing the ultimate cost to the consumer below that at which screws could be produced with a socket and slot not diagonally related.

This is true as applied to either flat or round-headed screws and while I have chosen to illustrate my diagonal socket and slot combination as applied to a round headed screw, it is to be understood that the invention is not to be construed as limited to use in this connection, since a common advantage is obtained in either case.

Screws constructed as described are universally adaptable for all classes of use and the work of the mechanic will be greatly facilitated for the type of head shown may be applied to wood or metal screws.

What I claim as my invention is:

An improved screw having a head formed with a central rectangular socket in combination with a slot extending across the head and diagonally intersecting the socket, whereby said combined socket and slot are formed with the minimum displacement of metal.

PETER L. ROBERTSON.